Aug. 18, 1959  F. JOHANNSEN  2,900,248
DIRECT SMELTING PROCESS IN ROTARY KILNS
Filed Feb. 4, 1957  2 Sheets-Sheet 1
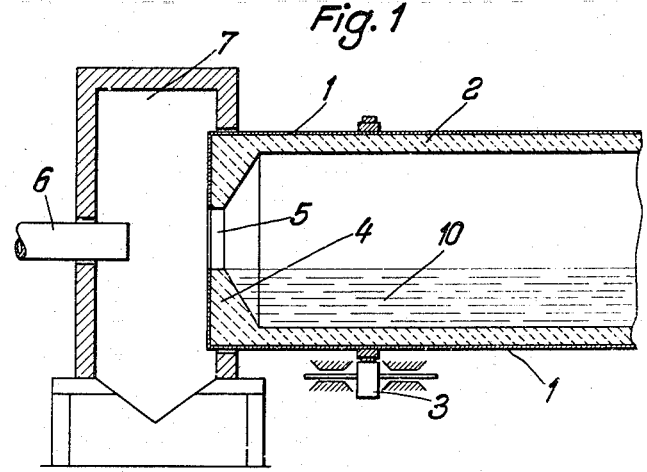
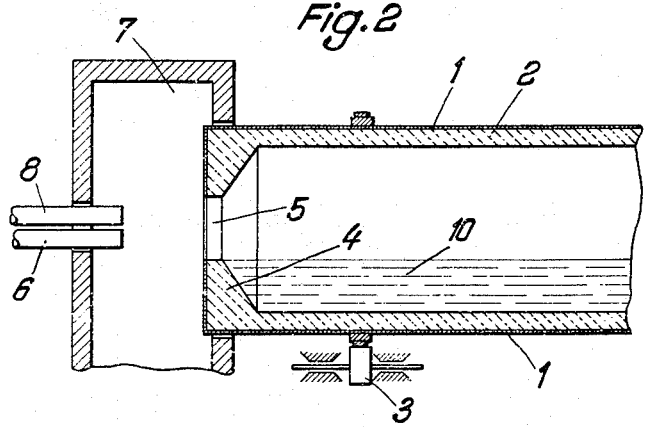
Inventor:
FRIEDRICH JOHANNSEN
By Taulmin & Taulmin
Attorneys

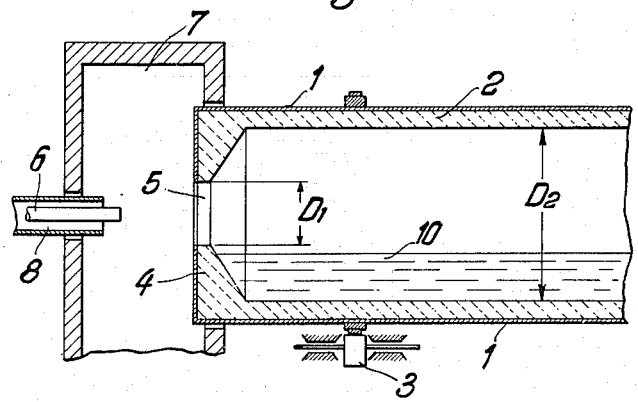
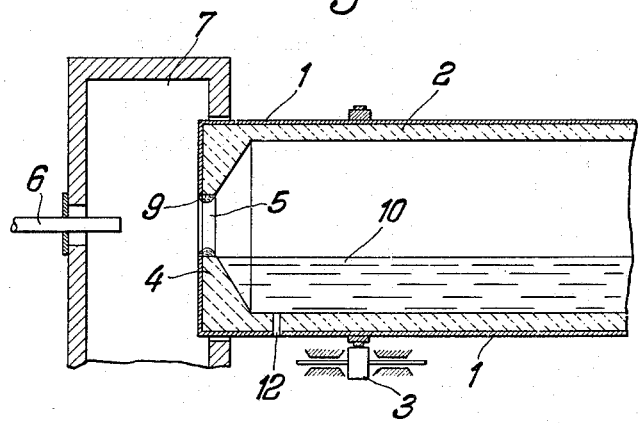

2,900,248
DIRECT SMELTING PROCESS IN ROTARY KILNS

Friedrich Johannsen, Clausthal-Zellerfeld, Germany, assignor to Aktiengesellschaft für Unternehmungen der Eisen- und Stahlindustrie, Essen, Germany Application February 4, 1957, Serial No. 638,163

Claims priority, application Germany February 4, 1956

1 Claim. (Cl. 75—36)

This invention relates to process for producing iron and related metals; it relates more particularly to an improved process for the production of iron and related metals by the Krupp direct smelting process in a rotary kiln. Metals related to iron in the meaning of this invention comprise nickel, cobalt, tungsten and molybdenum, i.e. those metals of groups VI, VII and VIII of the periodic table which can be produced by the Krupp direct smelting process.

It is an object of my invention to provide a direct smelting process for the production of iron and related metals, which permits to control the nature of the metallic nodules formed with regard to their size, and/or carbon content.

It is another object of my invention to provide a direct smelting process for the production of iron and related metals in rotary kilns, which permits to work with substantially less fuel consumption.

It is a further object of the invention to provide a direct smelting process for the production of iron and related metals in the liquid phase, similar to that resulting in a blast furnace, but with a substantially lower rate of fuel consumption.

It is well known in the art that oxidic ores and other raw materials containing oxides of iron and related metals, can be reduced in a rotary kiln, by working according to the Krupp direct smelting process, whereby metal nodules are formed during the nodulizing phase of the process by a kind of welding effect which occurs between finer metal particles in the interior of the slag. Subsequently these nodules are separated from the slag.

Long, inclined rotary kilns are used for this process. These kilns are provided with a charging head and have a discharge end enclosed in a discharge head. The ores and other oxidic raw materials containing oxides of iron or related metals are charged through the aforesaid charging head into the kiln at the upper end thereof. These ores and other raw materials are usually charged in mixture with more or less finely divided carbonaceous fuels and with fluxes, if required. The mixtures pass through the kiln from the upper end toward the lower discharge end thereof, countercurrently to the gases which are caused to pass through the kiln.

The discharge end of the kiln proper is usually devised as a circular end wall surounding a central opening and acting as an annular baffle on the charge moving through the kiln by damming the same up.

The charge which is dammed up mainly in the nodulizing zone, remains in this zone for a prolonged period of time.

The ratio of the internal cross sectional area of the aperture surounded by the annular baffle rim or wall at the discharge end to the normal internal cross sectional area of the kiln is usually in the order of from 1:3 to 1:5.

In the conventional operation of the kiln, air or other oxygen-containing gases, such as air enriched in oxygen, or pure oxygen, which are required for the combustion of the gases developed during the reduction process in the central region of the kiln, are sucked into the kiln by means of the natural draught or buoyancy prevailing in the kiln interior which normally ends in a flue and flue stack. The air required in the nodulizing zone, i.e. near the discharge end of the kiln, is injected into the kiln from the discharge end thereof, either in the form of normal air, or as oxidizing heating gases. At the same time, the major portion of the kiln is maintained at a low, reduced pressure of about 2 to 5 millimeters water column, while at the charging end of the kiln, there prevails a pressure coresponding to the atmospheric pressure or a weak excess pressure. Conventionally, about one half of the amount of air required for the entire process is sucked in by the inclined kiln itself, while the second half is blown into the kiln in the form of air or of heating gases. This mode of operation results in an average gas velocity of 4 to 8 meters per second in the nodulizing zone under the temperatures prevailing therein, and in an average gas velocity of about 2 to 4 meters per second at the charging end of the kiln.

The Krupp direct smelting process is disclosed, for instance, in Patents Nos. 1,964,917; 2,026,683; 2,709,650 and 2,721,794.

The above-stated objects are attained and a considerable increase of the throughput rate of the kiln is achieved by the improved direct smelting process, according to the invention, for the production of iron and related metals by the reduction of oxidic ores and other raw materials with a solid fuel in a rotary kiln having an apertured baffle-rimmed discharge end wall, which process comprises, as a main feature, the step of injecting the air or other oxygen-containing gases required for the known oxidic or combustion reactions of the process into the kiln under such pressure that an excess pressure is created in the whole interior of the kiln. The known combustion reactions in the kiln comprise the combustion of a part of the solid fuels admixed to the charge, and combustion of the carbon monoxide gases developed from the charge during the reduction phase in the kiln. They further comprise the combustion of a small proportion of the iron sponge to ferrous oxides in the lumping or nodulizing zone as described in the Patent 2,026,683, supra.

By injecting the air or other oxygen-containing gases into the kiln at such a rate that an excess pressure is continuously maintained in the kiln, the rate of flow of the gases through the kiln is increased above that rate which is attainable by the conventional operation of the kiln under suction, i.e. with a slightly reduced pressure in the kiln which creates a draught that sucks air into the kiln interior.

According to a preferred mode of operating the process according to the invention, air or oxygen-containing gases are blown into the kiln from the discharge end thereof through a nozzle, the discharge end of which does not protrude through the aperture in the baffle ring end wall into the interior of the rotary kiln proper, but terminates short of that aperture in the outer discharge head chamber surrounding that end of the rotary kiln. The air is thus blown out of the nozzle mouth immediately in front of the apertured baffle rim end wall.

This procedure naturally requires a higher discharge velocity of the air from the nozzle, than when the nozzle is introduced into the interior of the kiln.

If the nozzle protrudes into the kiln, an air or gas velocity of from 8 to 10 meters/second is required for the purposes of the invention, while, according to the aforesaid preferred mode of operation, a velocity of more than 10 meters/second is required. However, the preferred arrangement of the nozzle mouth ending short of the aperture in the baffle rimmed end wall of the kiln has considerable advantages in facilitating the servicing of the kiln.

The actually required velocity of the gases injected from the nozzle mouth into the kiln, varies, from case to case, and depends on the distance of the nozzle mouth from the baffle ring end wall, and on the diameter of the aperture in the latter. Furthermore, it is preferable, when using nozzles ending short of the apertured end wall, to apply more than the theoretically required amount of air or oxygen-containing gases, since part of the same will be deflected and not reach the interior of the kiln.

As has been stated above, the term "oxygen-containing gases" comprises air, oxygen-enriched air, other oxygen-containing gas mixtures, and also pure oxygen.

The oxidizing gases may be preheated before injecting them into the kiln.

The above-mentioned novel steps proposed in the direct smelting process according to my invention bring about drastic changes in the successive occurrences during the various phases of the process.

The air which is injected with a velocity higher than the velocity prevailing in the kiln itself is more turbulently agitated in the lower and central portion of the kiln than the air drawn in by kiln suction, and causes a substantially more rapid and intense combustion of the reduction gases developed therein. An increased temperature in the discharge zone of the kiln and a quicker and more complete reduction of the oxides in the central region of the kiln, are the result. Therefore, the amount of auxiliary heating by means of burners conventionally provided at the discharge end of the kiln, may be considerably restricted. At the same time, the fuel admixed to the charge is better exploited, in consequence whereof the quantity of solid fuel of 30 to 40% usually required for the reduction of ores in a rotary kiln, can be reduced to 22 to 30% by weight of the total charge.

The intensive combustion at the discharge end of the kiln due to the novel process steps according to the invention, and the increased temperature thereby generated in this kiln zone, also decreases the viscosity of the slag, and consequently favors the formation of larger nodules, even at the higher throughput rate of the kiln, i.e. at the shorter period of time during which the charge is present in the nodulizing zone.

The occurrences in the kiln during the direct smelting process according to the invention, can be largely influenced, and the nature of the metal nodules produced by this process can be largely determined, as to their size, carbon-content and solid or liquid state by steering the entire process, at will, through selecting a suitable pressure of the air injected according to my invention at the discharge end of the kiln, and thereby choosing an appropriate air velocity at the discharge end of the nozzle.

Thus, when it is desired to produce solid nodules of low carbon content, i.e. a carbon content of less than 0.8%, the velocity of air at the nozzle mouth is preferably maintained at a range of 10 to 30 meters/second, and the total amount of air required during the smelting process is supplied by injection within this pressure range.

If, on the other hand, large nodules are to be obtained, i.e. nodules of more than 4 mm. average diameter, the process according to the invention must be carried out in such a manner that part of the total amount of air required in the kiln is injected at a high velocity of, for instance, 20 to 100 meters/second, while the remaining amount of air is either sucked in through the aperture in the baffle ring of kiln discharge end, as it would be sucked into an injector, whereby the velocity of this remaining portion of air is reduced, and so is ultimately the velocity of the entire air mass in the kiln.

Or, according to another mode of operation, according to the invention, the aforesaid remaining portion of air is injected through a second nozzle at a velocity lower than that of the first mentioned air portion.

When operating in this manner, that part of the air which is under high pressure, reaches the interior of the kiln, so to speak, in a compact core, and this air core impinges on the charge in the kiln, whereby the temperature at the point or zone of impingement is raised particularly high. While this causes, on the one hand, a danger of uneven temperature distribution in the kiln, it has, on the other hand, the desired effect of favorably influencing the formation of large size nodules.

The size of the nodules can be substantially controlled by altering the pressure and quantity of injected air.

According to another feature of the process according to my invention, if it is desired to obtain a liquid metal, preferably iron or iron alloys, having a carbon content increased above a content of about 1.5% together with the formation of a liquid or a solid slag, as the case may be, then the total amount of air required in the kiln should be injected at a high velocity (on leaving the nozzle mouth) of about 50 to 150 meters/second. Also, in this case, the internal diameter of the aperture in the baffle ring end wall of the kiln should be held particularly small, so that only a small portion of the air in the kiln will enter the same through suction.

The reactions taking place in the kiln under this last described mode of operation, resemble those occurring in front of the tuyeres in a blast furnace with this difference, that, in the present case of a rotary kiln, strongly reducing gases are only present in the interior of the charge, while the same are burned immediately above the charge upon leaving the same, so that the kiln atmosphere in the kiln space above the charge is filled practically with carbon dioxide and nitrogen alone.

This signifies a considerable advantage since it shows that all carbon monoxide has been effectively used up for the purposes of the process. The fuel consumption in a rotary kiln operated according to the process of the invention, is, therefore, considerably lower than in the known processes including blast furnace processes, a part from the well known fact that the fuel used in rotary kiln processes may be fine-grained, while blast furnace processes require a firm, charge-supporting, metallurgic coke.

In the drawings, there are represented by way of example, several modes of constructing the discharge end of a rotary kiln of the type used for the direct smelting process, in order to adapt the same for use with the process according to the invention.

In the drawings:

Figure 1 illustrates an embodiment of the discharge end of a rotary kiln provided with air injection for carrying out the process means according to the invention with a view of obtaining solid nodules of a low carbon content;

Figure 2 illustrates an embodiment of a kiln discharge end similar to that shown in Figure 1 but adapted for obtaining large nodules of normal carbon content;

Figure 3 shows another embodiment of a kiln discharge end adapted for the same purpose as in Figure 2; and Figure 4 shows yet another embodiment of a kiln discharge end similar to that shown in Figure 1, but adapted for obtaining liquid metal having a high carbon content.

Referring to the drawing more in detail, and in particular to Figure 1, reference numeral 1 designates a sheet metal hull of the rotary kiln cylinder which is lined with a fire-proof ceramic layer 2 on the inside thereof.

The kiln is supported on a plurality of roller means 3 of which only those nearest the discharge end of the kiln are shown. The kiln is set in rotation by the conventional power drive (not shown). It possesses a charging or upper end and an discharge or lower end, both ends being enclosed by chambers in kiln heads usually built from fire-proof masonry. In the drawing, only the kiln head at the discharge end of cylinder 1 is shown, which comprises a chamber 7.

In the end wall at the discharge end of the kiln, there is provided a central aperture 5 surrounded by the end wall portion forming a baffle ring 4 for damming up the charge 10 in the nodulizing zone of the kiln adjacent the discharge end.

In Figures 2 and 3 the ratio of the internal cross sectional area of the aperture surrounded by the annular baffle rim or wall to the internal cross sectional area of the kiln is about 1:4, in Figs. 1 and 4 about 1:6.5.

The charge 10 in the nodulizing zone is dammed up by baffle ring 4 to maintain a certain depth, whereby an undesirably strong oxidation of the iron or other metal obtained by reduction of its oxides is prevented.

Into the chamber 7 of the discharge head there protrudes a burner pipe 6 which serves for heating the kiln by means of gaseous, liquid or fine-grained pulverulent fuels.

Air is injected into the kiln through this same burner pipe 6 which ends in a nozzle at a short distance from aperture 5 in the baffle ring 4.

While, in Figure 1, air is injected through pipe 6 at a velocity of 10 to 30 meters/second in order to obtain solid nodules of low carbon content, the air velocity is increased to 20 to 100 meters/second in the embodiment shown in Figure 2. At the same time additional air is sucked into the kiln automatically at a lower velocity than that prevailing in pipe 8. Large nodules are thereby obtained.

In Figure 3, the same result is achieved by injecting additional air through a second air pipe 8 at a velocity lower than that injected simultaneously through pipe 6. Preferably, pipe 8 concentrically encloses pipe 6.

Finally in Figure 4, liquid metal having a higher carbon content than 1.5% is obtained by injecting air at a flow rate of 50 to 150 meters/second. The aperture 5 is also narrowed, in this mode of operation, by a solid slag deposit 9, which is formed about the circumference of the aperture 5. The molten iron is withdrawn through tap hole 12.

Nodule size can be influenced by controlling the rate of flow by conventional control means (not shown) in pipes 6 and/or 8.

The process according to the invention is further illustrated by a number of examples given below which are, however, not meant to be limitative in any way. For the sake of comparison a known process is described in Example I.

*Example I*

The conventional Krupp direct smelting process is carried out in a rotary kiln having an internal cylinder diameter of 3.50 meters and a length of about 70 meters. The baffle ring at the discharge end of this kiln has an aperture diameter of 1.70 meters. The throughput of kiln having these dimensions and operated by the known process is about 450 metric tons of ore per day. 120 tons of small coke (coke breeze) and 24 tons of coal dust, i.e. a total of about 32% by weight of carbonaceous fuels are required for additional heating of the kiln. Air is introduced into the kiln at a rate of 25,500 cubic meters (cbm.) per hour, which is sucked through the kiln due to the buoyancy of the flue stack. The draught of the kiln is supplemented by blowing per hour approximately half the above stated amount of air in mixture with coal dust into the air. During this injection period, a small excess pressure in the order of 3 millimeters water column is created at the charging end of the kiln, while simultaneously a depression of about 2 millimeters water column exists at the discharge end of the kiln, through which end the air is injected. It follows that during the heating period of the kiln, additional air is being sucked into the kiln concurrently with the injected air.

*Example II*

The first mode of operation of the process according to the invention illustrated in Figure 1 is to be carried out in the following manner:

The rotary kiln is assumed to have the same dimensions as in Example I, except that the baffle ring has a central opening of a diameter of 1.35 meters. The nozzle mouth of pipe 6 has a diameter of 80 centimeters (cm.) and is located at a distance of 1 m. from the baffle ring aperture.

Air is blown into the kiln at a rate of about 37,000 cbm. per hour which corresponds to a gas velocity of 20 meters/second.

Since the nozzle ends by the aforesaid distance away from the kiln cylinder discharge end, only about 35,000 cbm. reach the interior of the rotary kiln cylinder, thereby creating an excess pressure of from 3 to 6 millimeters water column throughout the entire rotary kiln cylinder.

This mode of operation of the process according to the invention leads to an increase in the kiln throughput to 750 tons of ore per day. The amount of small coke incorporated in the charge was only 170 tons per day for this increased amount of charge, and only 12 tons of additional fuel was required. The total amount of carbonaceous fuel required in the heating of the kiln, was thus reduced to about 24% by weight of the processed ore.

The modules obtained in this case had an average size of 6 mm. and a carbon content of 0.62%.

*Example III*

The same high throughput rate and low fuel consumption were achieved in a rotary kiln as illustrated in Figure 3 of the drawing. The dimensions of the rotary kiln were the same as in Example I. The double nozzle for use with the kiln comprises an inner nozzle having a diameter of 37.5 cm. and an outer nozzle of 67.5 cm. diameter. Through each of these nozzles an amount of about 1,850 cbm. per hour is injected into the rotary kiln cylinder. This corresponds to an air discharge velocity of 50 meters/second at the mouth of the internal nozzle, and a velocity of 20 meters/second at the mouth of the external nozzle.

The nodules obtained by this mode of operation of the process according to the invention have, for instance, an average size of 8 mm., the carbon content of the nodules was 0.8%, of which 25% had a grain size above 1 cm.

*Example IV*

The same mode of operation as in Example III is repeated in a kiln having the same dimensions as in that example. However, the air jet injected through the inner nozzle into the kiln was given a velocity at the nozzle mouth of 80 meters/second, whereby about 28,000 cbm. per hour are injected into the kiln. A deposit of solid slag is formed about the circumference of the aperture in the baffle ring which narrows the internal diameter thereof to 1.20 meters.

The resulting nodules are larger than those obtained in Example III, 35% of the nodules, or 10% more than in Example III having a grain size above 1 cm. The carbon content of the nodules is raised to 1.2%.

*Example V*

The process according to the invention is carried out, according to the mode of operation illustrated in Figure 4, with a rotary kiln having the same dimensions as in Example I, except that a nozzle is used whose mouth has a diameter of 30 cm.

If air is injected into the kiln through this nozzle at a rate of about 39,000 cbm. per hour, which corresponds to an air velocity at the nozzle outlet of 120 meters/second, a slag deposit is formed about the inside surface of the aperture in the baffle ring, which reduces the free passage diameter through the aperture to 90 cm. This leads, in turn, to a substantial increase in the depth of the charge layer dammed up by the baffle ring. The temperature in the discharge zone rises to 1,350° C.

No additional fuel dust need be added to the injected air.

The carbon content of the resulting liquid iron is raised to 2.8%. The major portion of the iron is drawn off through the tap hole, while the remaining portion which is distributed throughout the relatively low-viscous slag in the form of fine droplets, is recovered from the cooled slag by comminution of the latter and subsequent magnetic separation.

What I claim is:

In the Krupp direct smelting process for the reduction of iron and related metals from ores and other raw materials containing said metals with a solid carbonaceous reducing agent in a rotary kiln having a baffle ring at its discharge end for damming up the charge and a central aperture in said baffle ring, the improvement, whereby the carbon content and the physical state of the reduced metal and, when the reduced metal is in the solid phase, the nodule sizes thereof are selectively controlled and the product obtained varies between solid metal nodules having a carbon content below 1.5% and a liquid metal having a carbon content above 1.5%, which improvement comprises the steps of injecting at least part of the oxygen-containing gases required for carrying out the process into the kiln countercurrently to the movement of the charge therethrough so as to create an excess pressure in the entire rotary kiln interior by releasing a jet of said gases outside the rotary kiln interior in front of said baffle ring, additionally introducing the remaining part of said gases separately into said kiln through the discharge end thereof, adjusting selectively the gas velocity of said jet between 10 and 150 meters per second dependent upon the releasing distance of said jet from said baffle ring and the ratio of the internal width of the baffle ring aperture to that of the kiln interior ranging between 1:3 and 1:6.5, and maintaining a determined ratio of the amount of said gases in said jet to the amount of additionally introduced gases.

References Cited in the file of this patent

UNITED STATES PATENTS

| | | |
|---|---|---|
| 1,964,917 | Johannsen | July 3, 1934 |
| 2,026,683 | Johannsen | Jan. 7, 1936 |
| 2,349,688 | Wood | May 23, 1944 |
| 2,397,993 | Urquhart | Apr. 9, 1946 |
| 2,754,197 | Wienert | July 10, 1956 |

OTHER REFERENCES

"Smelting Low Grade Ores by the Krupp-Renn Process," The Iron Age, May 9, 1946, pp. 70–75.